March 25, 1930.  V. C. HANSEN  1,751,517
SHADE HANGER
Filed Aug. 13, 1928
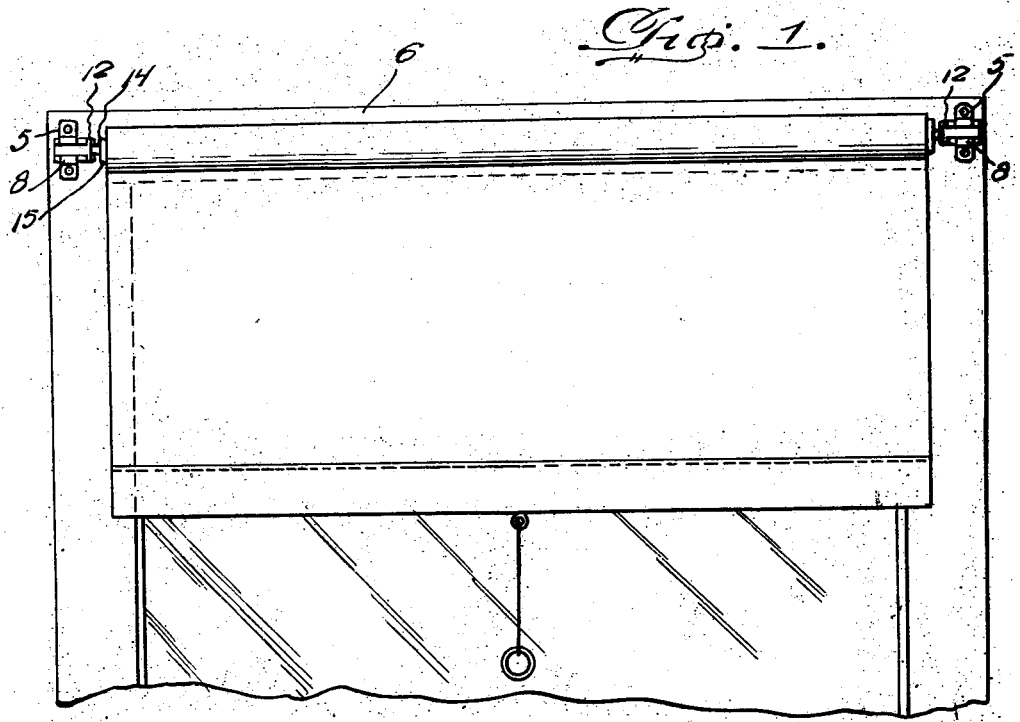
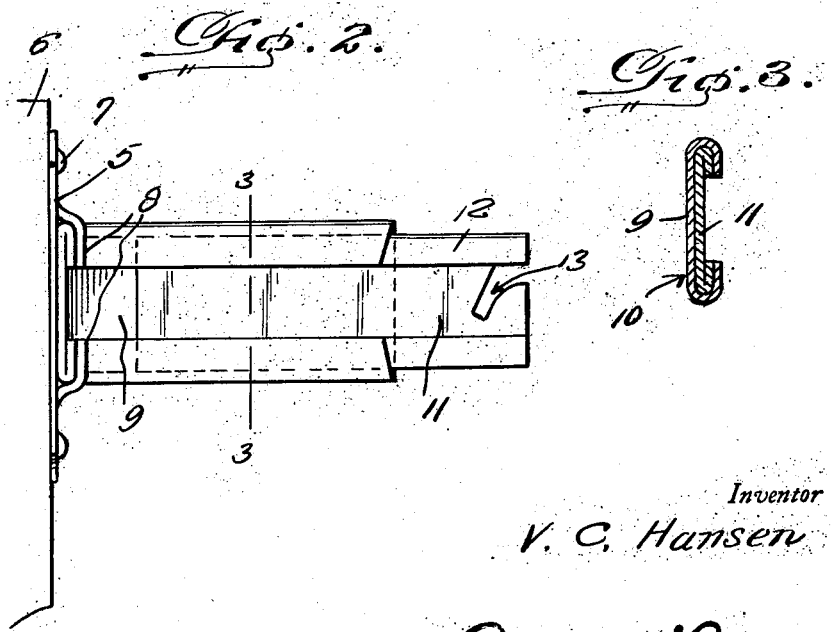
Inventor
V. C. Hansen
By Clarence A. O'Brien
Attorney Patented Mar. 25, 1930

1,751,517 the spirit of the invention or the scope of the appended claim, and I accordingly claim all such forms of the device to which I am entitled.

Having thus described my invention, what I claim as new is:

A shade hanger comprising a guide bracket, means for securing the bracket to the window sash, a supporting bracket having reinforcing flanges formed on its longitudinal edges and bent over one face thereof, said supporting bracket including right angularly extending arms, the flanges engaging the face of one arm and the flanges on the other arm being spaced from said face to provide guide ways, the arm having the flanges bent into engagement therewith being slidably mounted in said guide bracket for movement transversely of the window sash, and a shade roller-engaging section slidably carried in said guide flanges and having means formed at its outer end for receiving one end of a shade roller.

In testimony whereof I affix my signature.

VICTOR C. HANSEN.